(12) United States Patent
Hamano et al.

(10) Patent No.: US 6,460,835 B1
(45) Date of Patent: Oct. 8, 2002

(54) WHEEL SUSPENSION SYSTEM AND SPRING THEREFOR

(75) Inventors: Toshio Hamano, Yokohama (JP); Hirotake Kato, Yokohama (JP); Iwao Shigeoka, Yokohama (JP); Takahiro Nakamura, Yokohama (JP); Toshiyuki Kamakura, Yokohama (JP); Masaya Komazaki, Yokohama (JP)

(73) Assignee: NHK Spring Co., Ltd., Kanagawa-Ku (JP)

( * ) Notice: Subject to any disclaimer, the term of this patent is extended or adjusted under 35 U.S.C. 154(b) by 0 days.

(21) Appl. No.: 09/509,289

(22) PCT Filed: Jul. 27, 1999

(86) PCT No.: PCT/JP99/03999
§ 371 (c)(1),
(2), (4) Date: Mar. 21, 2000

(87) PCT Pub. No.: WO00/06401
PCT Pub. Date: Feb. 10, 2000

(30) Foreign Application Priority Data

Jul. 27, 1998 (JP) ............................................ 10-210478
Jan. 20, 1999 (JP) ............................................ 11-011678

(51) Int. Cl.$^7$ ............................................... B60G 11/56
(52) U.S. Cl. ......................... 267/34; 267/221; 267/180; 267/167; 267/286
(58) Field of Search ........................ 267/221, 34, 259, 267/4, 180, 166, 170, 220, 167, 248, 286, 291; 280/124.146, 124.179, 124.141, 124.168

(56) References Cited

U.S. PATENT DOCUMENTS

| 210,027 | A | * | 11/1878 | Hansell | ...................... 267/166 |
| 2,643,109 | A | * | 6/1953 | Wood | .......................... 267/180 |
| 3,727,940 | A | | 4/1973 | Hug | |
| 4,561,640 | A | * | 12/1985 | Enke et al. | .................. 267/248 |
| 4,694,449 | A | * | 9/1987 | Einhaus | ....................... 369/246 |
| 4,903,985 | A | | 2/1990 | Muhr et al. | |
| 5,445,402 | A | | 8/1995 | Matschinsky | |
| 5,454,150 | A | | 10/1995 | Hinke et al. | |
| 6,155,544 | A | * | 12/2000 | Solomond et al. | ........... 267/220 |
| 6,199,882 | B1 | * | 3/2001 | Imaizumi et al. | ...... 280/124.146 |

FOREIGN PATENT DOCUMENTS

| DE | 1430586 A | 3/1969 |
| DE | 6935759 U | 12/1969 |
| DE | 3743451 A1 | 6/1989 |
| DE | 3900473 A1 | 7/1990 |
| DE | 4021314 A1 | 5/1991 |
| EP | 0319651 A2 | 6/1989 |
| FR | 2097109 | 3/1972 |
| GB | 1031650 | 6/1966 |
| GB | 1102492 | 2/1968 |
| GB | 1192766 | 5/1970 |
| JP | 62 028534 A | 2/1987 |
| JP | 01-156119 | 2/1990 |

* cited by examiner

Primary Examiner—Jack Lavinder
Assistant Examiner—Mariano Sy
(74) Attorney, Agent, or Firm—Marshall & Melhorn, LLC

(57) ABSTRACT

Provided is a wheel suspension system (4) and a spring (6, 16, 26) therefor which can improve the ride comfort of the vehicle by reducing the sliding resistance between the cylinder and the piston of the tubular shock absorber (5) surrounded by the compression coil spring without increasing the size of the suspension system and without complicating the assembly work. The compression coil spring is adapted to produce lateral forces between two ends thereof as the compression coil spring is extended and compressed by forming the coil spring so as to have cyclically varying pitch angle for each turn of the coil wire.

5 Claims, 6 Drawing Sheets

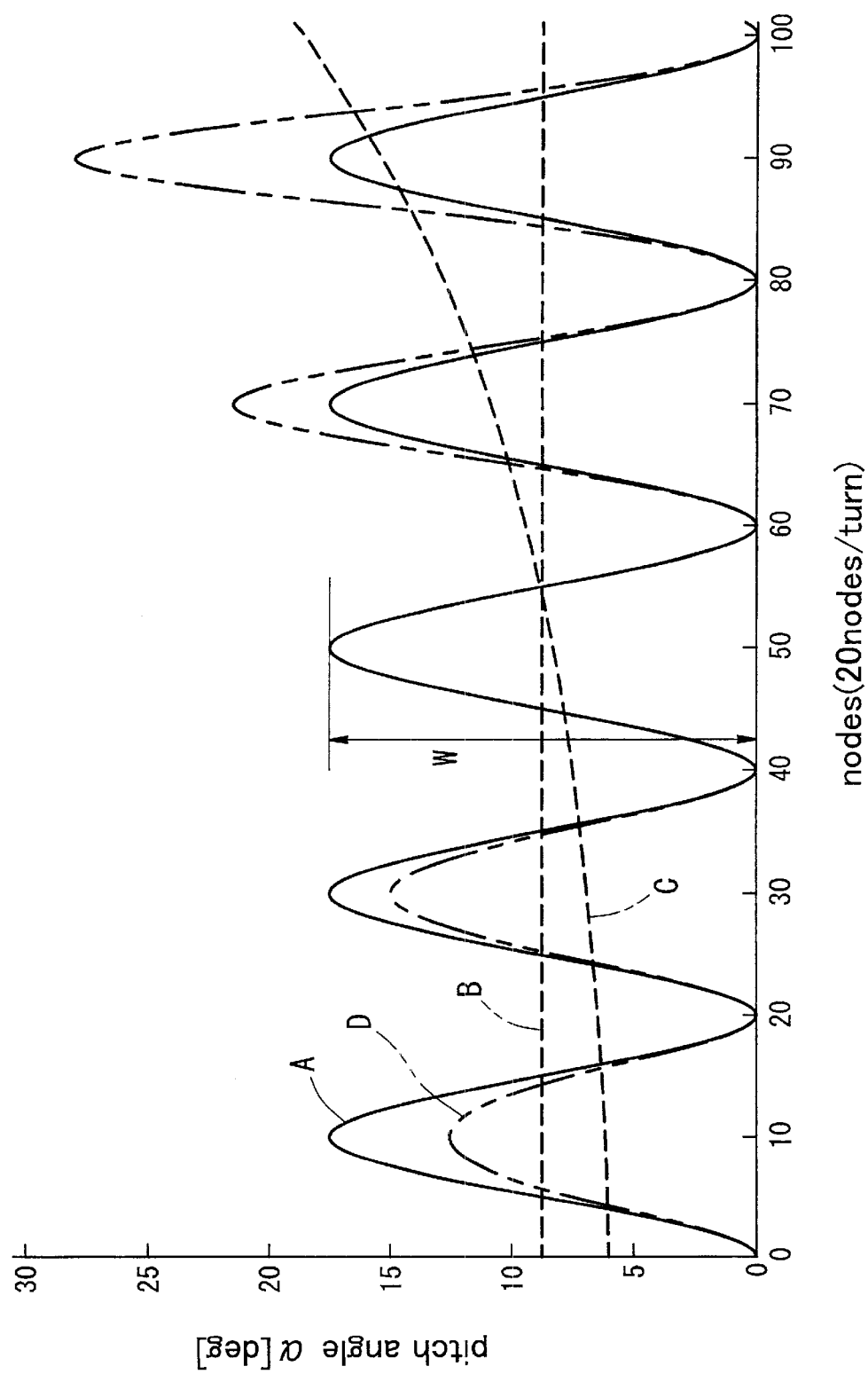

WHEEL SUSPENSION SYSTEM AND SPRING THEREFOR

TECHNICAL FIELD

The present invention relates to a wheel suspension system. More particularly, the present invention relates to a wheel suspension system which is characterized by a novel spring structure and a novel spring mounting arrangement, and a spring for such a wheel suspension system.

BACKGROUND OF THE INVENTION

Conventionally, in a strut type wheel suspension system, for instance, which is widely used in automobiles, a vehicle body and a link member of the wheel suspension system are connected to each other by an assembly including a tubular shock absorber consisting of a cylinder filled with oil and a piston received therein, and a compression coil spring surrounding the shock absorber. However, because the input from the tire does not necessarily align with the axial line of the shock absorber, and the shock absorber is subjected to a lateral load, the sliding part between the cylinder and the piston of the shock absorber is subjected to a lateral force and a moment so that the resulting sliding resistance impairs the ride comfort of the vehicle, and the durability of the shock absorber is diminished.

In view of this problem, conventionally, it was known to provide an angular offset between the axial line of the spring and the axial line of the shock absorber so as to produce a force and a moment in the spring which oppose those produced in the sliding part between the cylinder and the piston of the shock absorber. However, the amount of offset is limited by the diameter of the coil spring and the mounting space, and it was not always possible to produce an adequate lateral force and moment to entirely cancel the lateral force and moment produced from the input to the tire.

In Japanese patent laid-open publication No. 01-156119, it is proposed to use a coil spring having a curved axial line in its free state so as to cancel the force and moment produced in the sliding part between the cylinder and the piston of the shock absorber. However, it is not clear how a curved coil spring may be retained in a straight state, and curved coil springs suitable for wheel suspension systems cannot be manufactured at low cost.

BRIEF SUMMARY OF THE INVENTION

In view of such problems of the prior art, a primary object of the present invention is to provide a vehicle wheel suspension system comprising a tubular shock absorber, and a compression coil spring surrounding the shock absorber which can favorably reduce the sliding resistance that may be produced between the cylinder and the piston of the shock absorber without increasing the size of the system.

A second object of the present invention is to provide a vehicle wheel suspension system which can favorably reduce the sliding resistance that may be produced between the cylinder and the piston of the shock absorber, and can thereby improve the ride comfort of the vehicle and the durability of the shock absorber.

A third object of the present invention is to provide a vehicle wheel suspension system which can favorably reduce the sliding resistance that may be produced between the cylinder and the piston of the shock absorber without increasing the size of the system and without complicating the assembly work.

A fourth object of the present invention is to provide coil springs which are suitable for use in such vehicle wheel suspension systems.

According to the present invention, such objects can be accomplished by providing a vehicle wheel suspension system comprising a tubular shock absorber, and a compression coil spring surrounding the shock absorber, characterized by that: the compression coil spring is adapted to produce lateral forces between two ends thereof as the compression coil spring is extended and compressed.

In particular, when the lateral forces which are produced between the two ends are determined such that lateral forces which are produced between a piston and a cylinder of the shock absorber due to an offset between the line of action from a wheel and an axial line of the shock absorber may be minimized. Thus, the sliding resistance due to the lateral force acting between the cylinder and piston of the shock absorber can be favorably reduced so that the ride comfort of the vehicle and the durability of the shock absorber can be both improved.

The compression coil spring can be adapted to produce the required lateral forces between the two ends thereof as it is compressed and extended without increasing the size of the system and without suffering from geometrical restrictions if the compression coil spring consists of a coil spring which is wound around an oblique cylinder, and retained so as to have an upright axial line by applying a lateral initial load thereto, and to be extended and compressed along the upright axial line.

Similar objects can be accomplished if the compression coil spring consists of a coil spring which is wound around a true cylinder, and retained so as to have an oblique axial line by applying a lateral initial load thereto, and to be extended and compressed along the oblique axial line, or the compression coil spring consists of a coil spring which is wound around a true cylinder so as to have a cyclically varying pitch angle between a local minimum and a local maximum for each turn, and retained so as to be extended and compressed along the upright axial line.

BRIEF DESCRIPTION OF THE DRAWINGS

Now the present invention is described in the following with reference to the appended drawings, in which:

FIG. 7 is a graph showing the relationship between the node number (angle) and pitch angle ($\alpha$) of the coil spring.

DETAILED DESCRIPTION OF THE PREFERRED EMBODIMENTS

Figure 1:
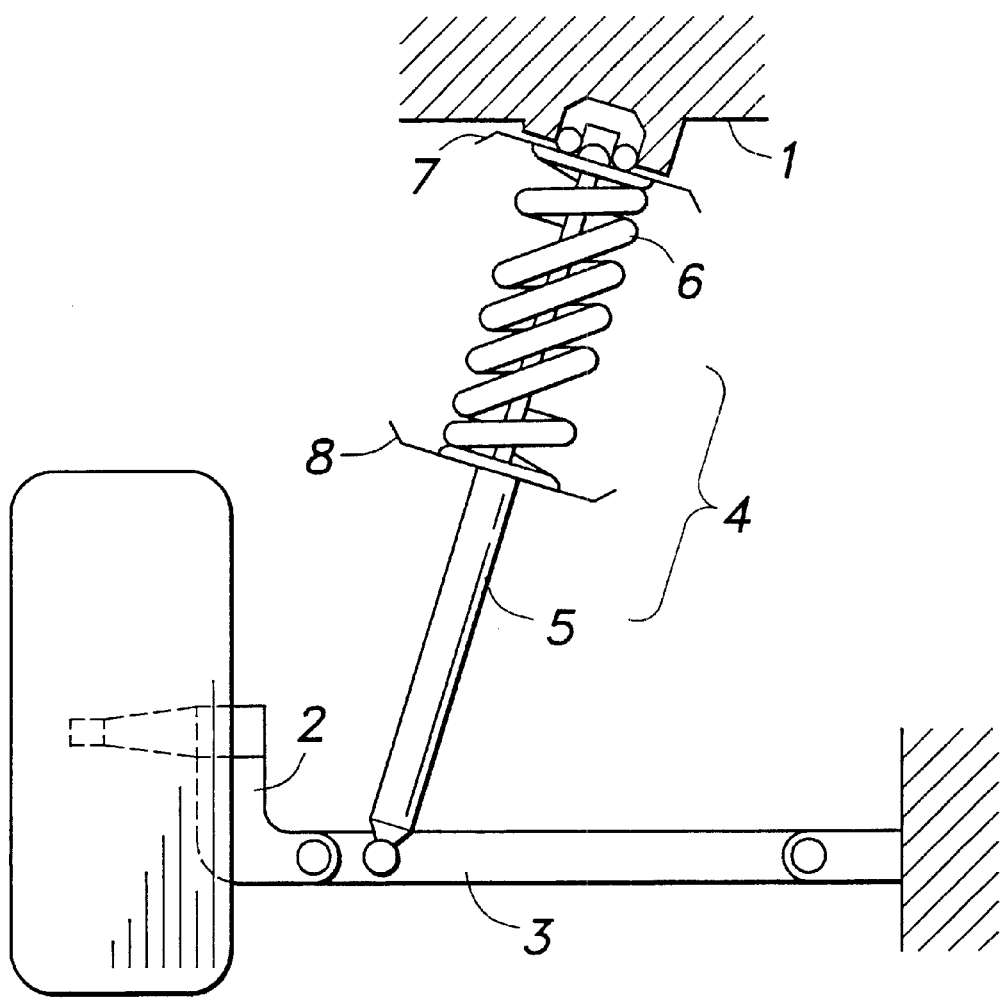
FIG. 1 is a fragmentary, partly broken away front view of an essential part of a vehicle wheel suspension system embodying the present invention.

FIG. 1 is a simplified fragmentary, partly broken away front view of an essential part of a vehicle wheel suspension system embodying the present invention. A strut assembly 4, having an upper end pivotally attached to a vehicle body 1 and a lower end pivotally attached to a link member 3 connecting a wheel carrier 2 to the vehicle body 1, comprises a shock absorber 5 consisting of a tubular oil damper, and a compression coil spring 6 retained by spring seats 7 and 8 between the cylinder and the piston of the shock absorber 5. The upper spring seat 7 is, jointly with the upper end of the piston rod of the shock absorber 5, pivotally attached to the vehicle body 1 via a rubber busing or the like, and the lower spring seat 8 is fixedly attached to the outer periphery of the cylinder of the shock absorber 5.

Figure 2:
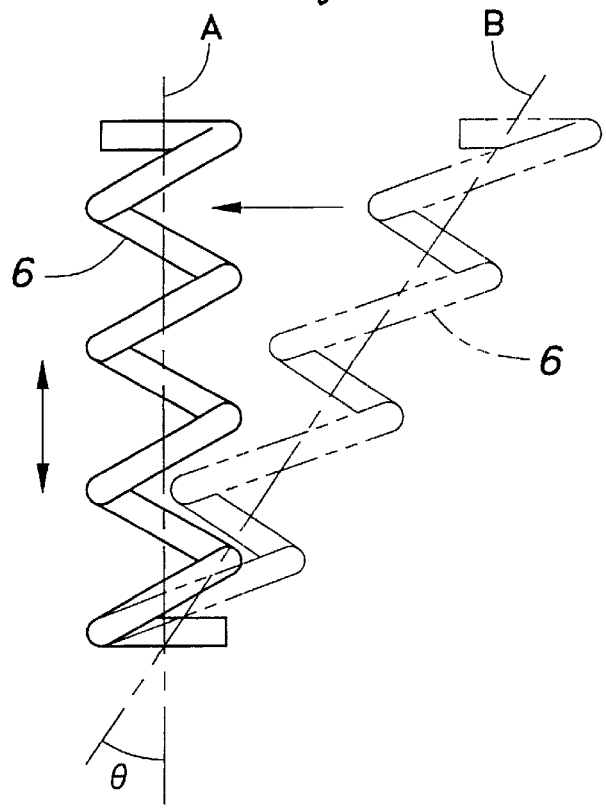
FIG. 2 is a view showing only the spring of the vehicle wheel suspension system embodying the present invention.

The compression coil spring 6 has a central axial line B which is tilted by an angle θ under no load condition as indicated by the imaginary lines in FIG. 2. This compression coil spring 6 can be deformed into a shape having a vertical axial line A or a normal compression coil spring by resiliently deforming this coil spring 6 by firmly retaining the two ends thereof, and applying laterally opposing forces of a prescribed magnitude to the two ends.

Figure 3:
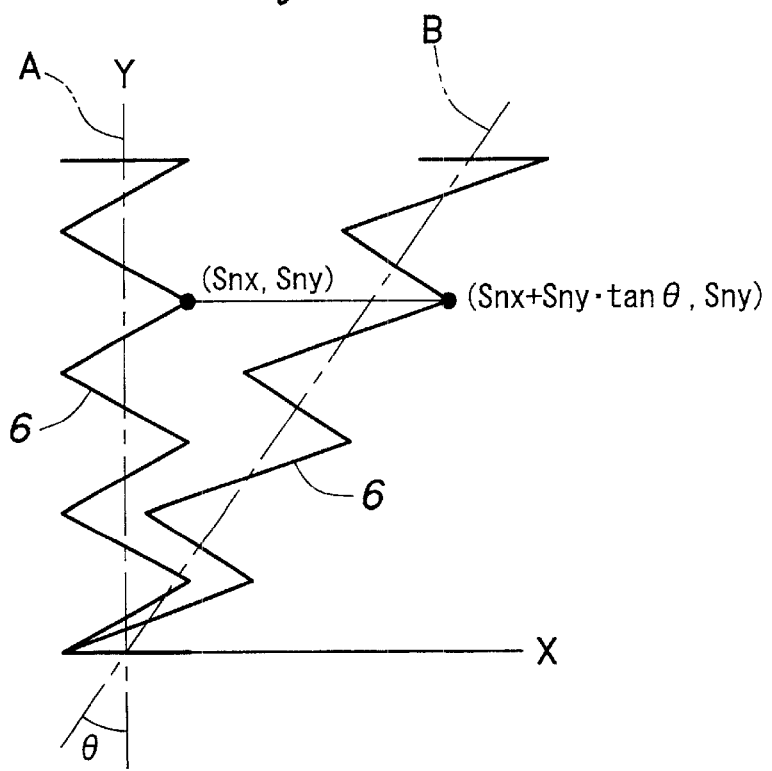
FIG. 3 is a diagrammatic view illustrating the spring of FIG. 2.

Referring to FIG. 3, this compression coil spring 6 can be considered as being obtained by tilting the vertical axial line A of a normal cylindrical coil spring, which is considered as having a reference shape, and obtained by applying the laterally opposing forces, to a tilted axial line B by an angle θ. More specifically, in the Cartesian coordinate system having a Y axial extending along the axial line A and a X axis extending perpendicularly to the axial line A in the tilting direction of the tilted axial line B, if an arbitrary point on the compression coil spring having the vertical axial line A is given by a coordinate (Snx, Sny), the corresponding point on the compression coil spring having the tilted axial line B can be given by maintaining the Y coordinate or Sny and shifting the X coordinate by the product of the Y coordinate Sny and tan θ with respect to the reference coordinate (Snx, Sny), or by the coordinate (Snx+Sny·tan θ, Sny). The tilt angle θ of the central line B of the coil spring 6 is determined by the lateral load that is applied between the cylinder and the piston of the shock absorber 5 of the vehicle. The two ends of the coil spring 6 are required to be retained with initial lateral forces and moments applied thereto, and the spring seats should be adapted to meet such requirements.

Such a coil spring 6 can be manufactured by winding a coil wire around an oblique cylindrical die while feeding the coil wire at a constant pitch with respect to the reference vertical axial line. The outer circumferential surface of the die may be either smooth or provided with a helical groove for guiding the coil wire. Such a coil process is typically conducted as a hot forming process, and the tempering and other processes are conducted thereafter.

The sliding resistance F between the cylinder and the piston of the shock absorber 5 can be given by the following equation, $$F = \mu \cdot N$$

where $\mu$ is a coefficient of friction, and N is a reaction force. The reaction force N is given by a mathematical function of the lateral load vector Rsus which is applied between the cylinder and the piston of the shock absorber 5.

The lateral load vector Rsus is in turn given by the following equation.

$$Rsus = Rgeo + Rcoil$$

where Rgeo is a geometrical lateral load vector which is geometrically determined by the difference in the directions of motion of the axle and the shock absorber in the particular wheel suspension system, and Rcoil is the lateral load due to the tilt angle of the coil spring. Because the sliding resistance F is reduced when the lateral load vector Rsus is reduced, the direction and magnitude of Rcoil should be selected so as to cancel Rgeo. Provided that other conditions are identical, the larger the tilt angle of the central line B is, the larger Rcoil becomes. Such a relation may be analytically determined. However, in practice, a finite element method may be used for determining the required relationship so that the coil may be wound according to an optimum design which best suits the particular application.

In this case, the coil spring 6 was tilted two-dimensionally, but may also be tilted three-dimensionally depending on Rgeo. The coil spring may also have a curved axial line under no load condition. The coil spring may also have a non-linear spring constant which changes in dependence on the deflection of the coil spring.

Figure 4:
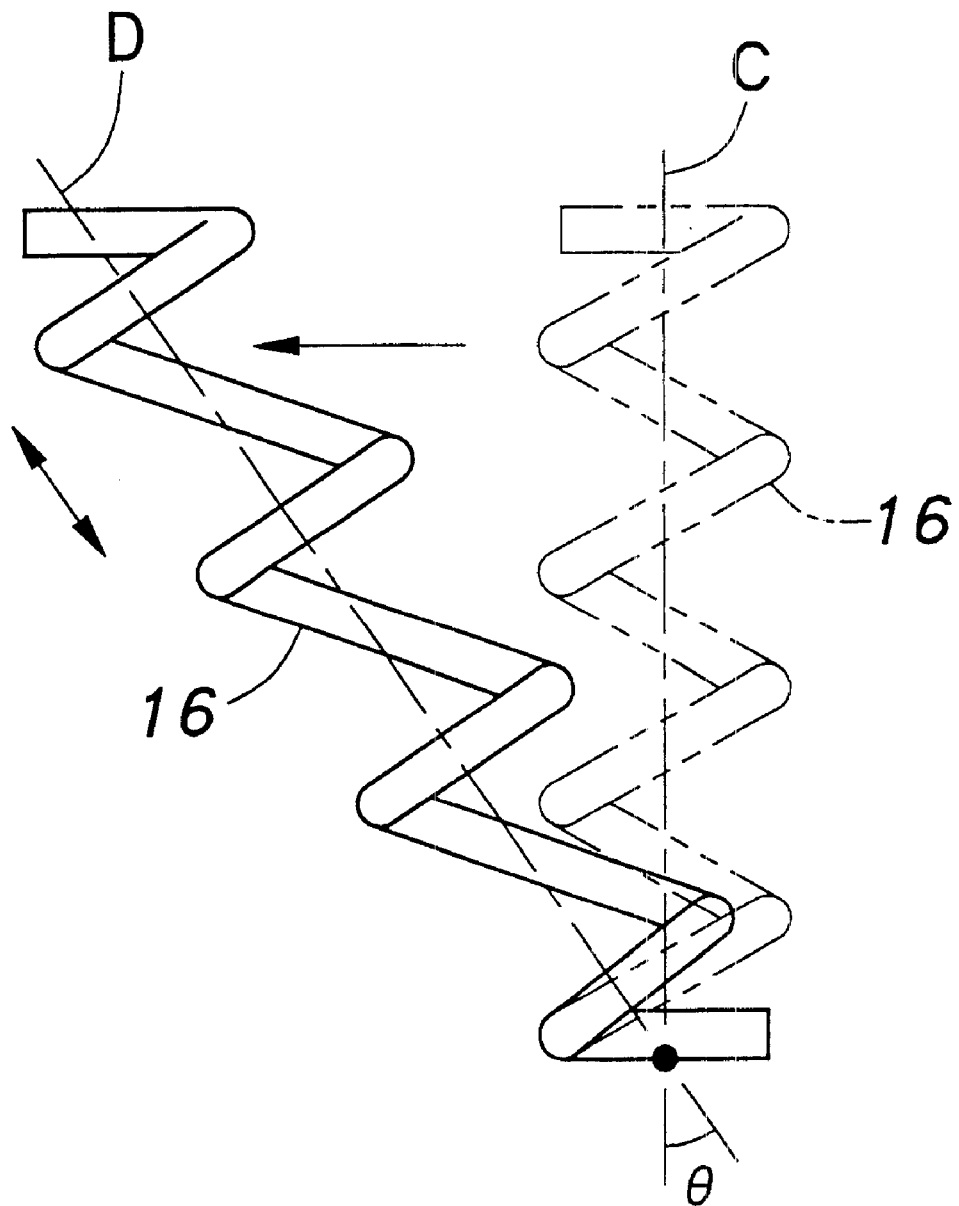
FIG. 4 is a view showing only the spring of another embodiment of the vehicle wheel suspension system according to the present invention.

It is also possible to use a normal cylindrical coil spring 16 having a vertical axial line C under the rest condition as indicated by the imaginary lines in FIG. 4 as a second embodiment of the present invention, in place of the spring 6 having the tilted axial line B under the rest condition. In this case, the two ends of the cylindrical coil spring 16 are firmly retained, and are subjected to lateral forces so as to tilt the axial line of the coil spring by an angle θ as indicated by the tilted axial line D during use. Furthermore, the coil spring 16 is compressed and extended along the axial line D. In this case also, the two ends of the coil spring 16 are required to be retained with initial lateral forces and moments applied thereto, and the spring seats should be adapted to meet such requirements.

Such a coil spring 16 can be manufactured by winding a coil wire fed from a feeder around a rotating cylindrical die of a coiling machine, much like winding a normal cylindrical coil spring. Such a coil process is typically conducted as a hot forming process, and the tempering and other processes are conducted thereafter. Likewise, the outer circumferential surface of the die may be either smooth or provided with a helical groove for guiding the coil wire.

Figure 5:
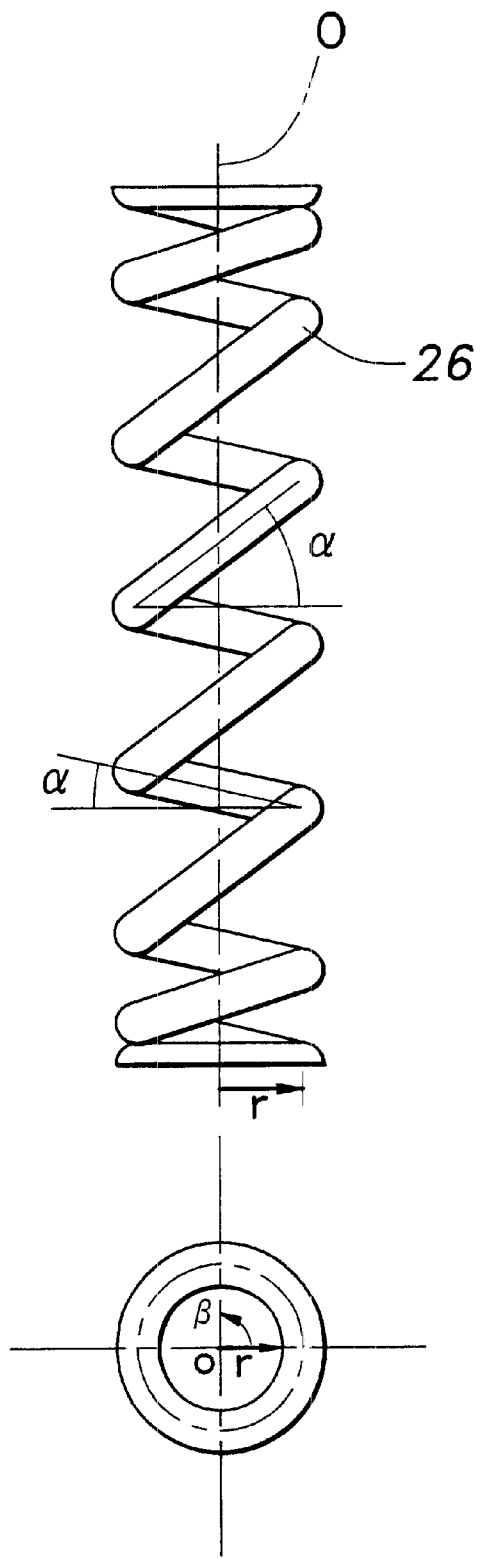
FIG. 5 is a view showing only the spring of yet another embodiment of the vehicle wheel suspension system according to the present invention.
Figure 6:
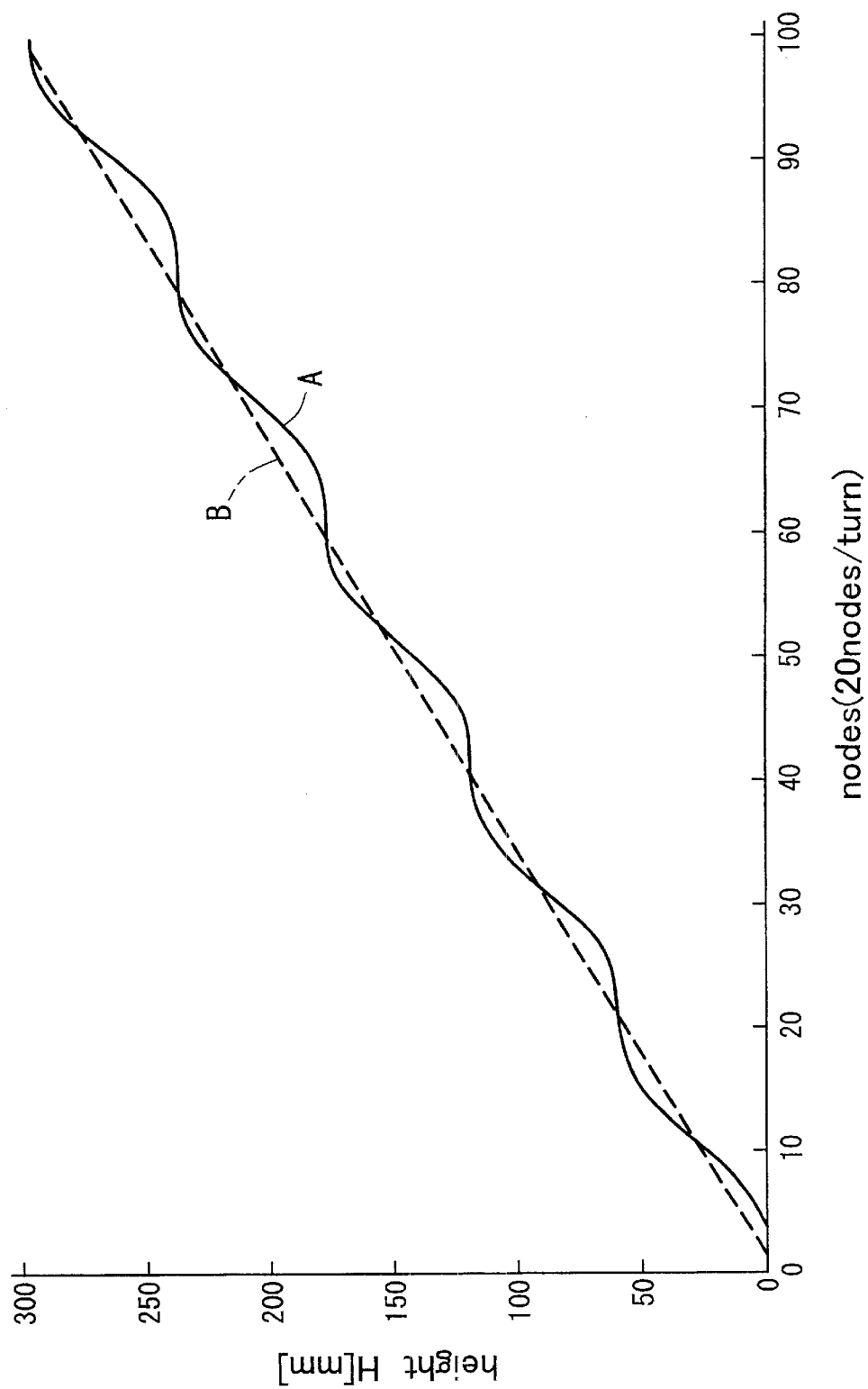
FIG. 6 is a graph showing the relationship between the node number (angle) and height (H) of the coil spring.

FIGS. 5 to 7 show a third embodiment of the present invention. This compression coil spring 26 has a shape as illustrated in FIG. 5 in its unstressed state. This consists of a constant-pitch cylindrical coil spring which has a constant radius r and a constant pitch P, and its axial line O is straight under no load condition. However, the pitch angle (α) changes cyclically for each turn. The pitch angle (α) is given as an increment (ΔH) of the spring height (H) for a given increment (r·Δβ) of a length (rβ) of the coil wire. Here, β denotes the angle of a point of the coil wire with respect to the central axial line in the winding direction.

Such a coil spring 26 can be manufactured by winding a coil wire fed from a feeding unit around a rotating cylindrical die in a normal way except for that the axial feed speed of the feed unit is not uniform but varied according to the rotational angle of the cylindrical die or the phase angle thereof. Thereafter, the tempering and other processes are conducted. In this case also, the outer circumferential surface of the die may be either smooth or provided with a helical groove for guiding the coil wire.

FIG. 6 shows a graph in which the ordinate corresponds to the number of nodes which are defined along the length of the coil wire at the rate of 20 nodes per turn of the coil wire, and the abscissa corresponds to the height (H) of each point on the coil wire. In the case of a normal coil spring, as indicated by the broke line B, the height (H) of each point on the coil wire increases in proportion to the number of nodes or the angle (β) of the nodal point on the coil wire in the winding direction. On the other hand, in the case of the coil spring illustrated in FIG. 5, as indicated by the solid line A, the height (H) cyclically increases and decreases with respect to the level of the broken line B in relation with the number of nodes or the angle (β) of the nodal point on the coil wire.

In the graph of FIG. 7, the nodal points are similarly defined, and the ordinate corresponds to the number of nodes while the abscissa corresponds to the pitch angle (α) of the corresponding point on the coil wire. As shown in this graph, the pitch angle (α) of the coil spring alternates between a local maximum and a local minimum for each 180 degrees in relation with the number of nodes or the angle (β) of the nodal point on the coil wire as indicated by the solid line A. More specifically, there is a peak and a dip of the pitch angle (α) for each turn of the coil (which includes 20 nodal points in the illustrated embodiment). When this coil spring 26 is compressed, a lateral forces are produced at each end in a certain direction. The coil spring 26 is installed in such a manner that these lateral forces oppose the lateral forces which are produced in the shock absorber 5.

The lateral forces that are produced at the two ends of the coil spring 26 become larger as the amplitude (W in FIG. 7) of the pitch angle (α) gets larger. This amplitude should be decided according to the lateral forces which may be produced between the cylinder and the piston. The geometrical structure of this coil spring 26 is similar to that of the coil spring 6 illustrated in FIG. 4 except for the arrangement of the coil ends. The reference seat surface of each coil end of the coil spring 6 illustrated in FIG. 5 is perpendicular to the direction of compressing the coil spring whereas the reference seat surface of each coil end of the coil spring 16 illustrated in FIG. 4 is perpendicular to the direction of constant pitch (A) of the spiral curve of the coil wire, and is inclined by the angle (θ) with respect to the central axial line of the coil spring.

In this embodiment, the pitch angle (α) changed cyclically between a local minimum and a local maximum for each 180 degrees, but the local minima and maxima may repeat at two points on each turn which is angularly offset from a diametrical line and, for instance, angularly spaced apart by 160 degrees as long as the angular positions of the local minima and maxima in each turn are fixed.

The present invention can be applied not only to cylindrical coil springs but also to conical coil springs, hourglass-shaped coil springs, barrel-shaped coil springs, and tapered coiled springs. FIG. 7 shows the relationship between the nodes or the angle (β) in the winding direction and the pitch angle (α) of conical springs, as well as those of the cylindrical coil spring having a cylindrical varying pitch angle as shown in FIG. 5 (solid line A) and a normal constant pitch angle cylindrical coil spring (broken line B). For instance, in the case of a conical spring having a constant pitch, because the axial increment of the coil wire for each turn is fixed, as indicated by the broken line C, the pitch angle (α) gradually increases with the increase in the number of nodes or in the number of turns. In the case of a conical spring having a cyclically varying pitch angle, its properties may be given as a composition of those given by the solid line A and broken line C or the pitch angle may cyclically increase and decrease, while the amplitude of the variation in the pitch angle gradually increases, with the increase in the number of nodes or in the increase in the angle (β) in the winding direction as shown by the double-dot chain-dot line D.

As can be appreciated from the above description, according to the vehicle wheel suspension system of the present invention, in a wheel suspension system comprising a tubular shock absorber and a compression coil spring surrounding the shock absorber which are connected between a vehicle body and a wheel, the spring is adapted to produce lateral forces which oppose the lateral forces that are produced in the shock absorber as the coil spring is compressed. Therefore, the sliding resistance between the cylinder and the piston due to the lateral load produced in the shock absorber can be reduced or totally eliminated without increasing the size of the suspension system.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle wheel suspension system comprising a tubular shock absorber, and a compression coil spring surrounding the shock absorber, wherein:

the compression coil spring consists of a coil spring which is wound around a true cylinder so as to have a cyclically varying pitch angle between a single local minimum and a single local maximum substantially at diametrically opposite positions for each turn for a substantial length of the spring, and retained so as to be extended and compressed along an upright axial line so as to produce lateral forces between two ends thereof as the compression coil spring is extended and compressed.

2. A vehicle wheel suspension system according to claim 1, wherein the lateral forces which are produced between the two ends are determined such that lateral forces which are produced between a piston and a cylinder of the shock absorber due to an offset between the line of action from a wheel and an axial line of the shock absorber may be minimized.

3. A vehicle wheel suspension system according to claim 1, wherein the compression spring has a substantially true cylindrical shape in an unstressed state thereof.

4. A compression coil spring which is wound around a true cylinder so as to have a cyclically varying pitch angle between a single local minimum and a single local maximum substantially at diametrically opposite positions for each turn for a substantial length of the spring.

5. A compression coil spring according to claim 4, wherein the compression spring has a substantially true cylindrical shape in an unstressed state thereof.

* * * * *